United States Patent Office 3,682,656
Patented Aug. 8, 1972

3,682,656
POURABLE MARGARINE
Inga Elna Maria Wilton, Stockholm, and Karl Lennart Emanuel Baurén, Ronninge, Sweden, assignors to Margarinbolaget AB, Stockholm, Sweden
No Drawing. Filed Oct. 29, 1970, Ser. No. 85,301
Claims priority, application Luxembourg, Nov. 14, 1969, 59,821/69
Int. Cl. A23d 3/00
U.S. Cl. 99—122                              13 Claims

ABSTRACT OF THE DISCLOSURE

The specification describes a pourable margarine of improved stability against phase separation, particularly at use temperature (e.g. about 18° C.) and refrigerator temperature (e.g. about 6° C.). The pourable margarine contains about 20% by weight of an aqueous phase and about 80% by weight of a fatty phase, which fatty phase contains about 92 to 99.5% by weight of a liquid vegetable oil and about 8 to 0.5% by weight of a hard fat component. The stability of the pourable margarine is further improved by the presence of about 0.5 to 20% by volume of gas bubbles, preferably nitrogen bubbles of a bubble size of 1–25 microns.

BACKGROUND OF THE INVENTION

Field of the invention

The invention relates to pourable emulsions having improved stability against phase separation. In particular the invention relates to pourable margarine and to a process for the preparation thereof.

Conventional margarine is plastic at ambient temperature. This plasticity is mainly attributable to the nature of the fatty phase of the water-in-oil emulsion constituting margarine, and particularly to the presence of substantial proportions of fatty matter which exists in the solid state at ambient temperatures.

It is generally accepted that the glyceride crystals of this fatty matter are present as a three dimensional solid network in which liquid oils and droplets of the aqueous phase are enclosed and that this arrangement forms an important contribution to the stability of the margarine emulsion against phase separation.

Further, attempts have been made to prepare margarine in a convenient form, namely one which is pourable at ambient and preferably at refrigeration temperatures, but which is nevertheless similarly stable against phase separation. The requirement for pourability however sets a limit to the amount of hard fat that can be incorporated in such compositions.

The prior art

In U.S. patent specification 3,338,720 (Michael J. Pichel) fluid margarine emulsions are described comprising 60–90% of a liquid glyceride oil having a cold test in excess of about eight hours, 40–10% of an aqueous phase containing milk solids, an emulsifier and about 0.75–5% of a hard fat.

This patent is concerned with the emulsion-stabilizing effect of a minor proportion of hard fat, preferably hydrogenated rapeseed oil.

The maximum hard fat content which can be tolerated in pourable margarine is dependent on several factors e.g. the viscosity of the margarine required at storage and use conditions, the type and melting point of the hard fat component used, and the process conditions under which the product is prepared. It is often found that the amount of hard fat necessary adequately to stabilize a pourable emulsion is incompatible with pourability. Thus pourable margarines so far proposed generally contain less hard fat than is necessary to stabilize the emulsion adequately against phase separation.

SUMMARY OF THE INVENTION

It has now been found that the stability against phase separation of a pourable margarine can be improved by incorporating in the emulsion an emulsion-stabilizing amount of gas bubbles. The pourable margarines of the invention thus contain a minor amount of gas bubbles as a stabilizing agent.

A particularly significant aspect of the invention is a pourable margarine, which is already partly stabilized against phase separation by a minor proportion of hard fat particles and which is further stabilized by a stabilizing amount of gas bubbles.

In general the stability of pourable margarines against phase separation is improved when the consistency values are increased. The consistency values of the pourable margarines of the invention are determined by means of a flow valve which will be described hereafter. Suitable pourable margarines have consistency values of from 10 to 1000, preferably from 20 to 600, more preferably from 50 to 300 sec./300 ml. at ambient temperature e.g. 18° C. and preferably also at refrigerator temperature, e.g. 6° C.

It is an advantage of the margarines of the present invention that their stability is improved with a less marked effect on the consistency values than would be obtained if only hard fat was used to obtain the same degree of stability. It is further of advantage that if any phase separation takes place in the margarine of the present invention, the oil layer will be formed at the bottom of the receptacle instead of at the top, so that the product has a more attractive appearance. Furthermore, a small oil layer at the bottom of the receptacle may cause a more complete emptying of the receptacle because in pouring the margarine out of the receptacle a greasing oil layer will be formed at the wall.

DESCRIPTION OF THE INVENTION

In this specification all parts and percentages are by weight, except the percentages of gas, which are by volume.

The pourable margarine of the present invention preferably consists essentially of from about 25–15% by weight of an aqueous phase emulsified with a fatty phase, said fatty phase consisting essentially of from 92–99.5% by weight of a glyceride oil which is pourable at all temperatures from 0–25° C. and the remainder of a hard fat of a slip melting point of from 40–80° C. and a particle size of at least 90% of the hard fat particles of 0.1 to 30μ, the margarine being stabilized against oil separation by 0.5–25% by volume of gas bubbles, at least 90% of which have a major dimension of 1–25μ.

More preferably the pourable margarine essentially consists of about 20% by weight of an aqueous phase emulsified with about 80% by weight of a fatty phase, said fatty phase consisting essentially of from 92–99.5% by weight of a liquid vegetable oil, at least 40% of the fatty acids of said liquid oil being polyunsaturated fatty acids, and the remainder of the fatty phase being a hard fat of a slip melting point of from 40–80° C. and a particle size of at least 90% of the hard fat particles of 0.1 to 30μ, the margarine being stabilized against oil separation by 0.5–25% by volume of gas bubbles, at least 90% of which have a major dimension of 1–25μ.

In particular the pourable margine of the invention essentially consists of about 20% by weight of an aqueous phase emulsified with about 80% by weight of a fatty phase, said fatty phase consisting essentially of from 92–

99.5% by weight of a liquid vegetable oil, at least 40% of the fatty acids of said liquid oil being polyunsaturated fatty acids, and the remainder of the fatty phase being a hard fat of a slip melting point of from 40–80° C. and a particle size of at least 90% of the hard fat particles of 0.1 to 30μ, the margarine being stabilized against oil separation by 0.5–25% by volume of gas bubbles, at least 90% of which have a major dimension of 2–10μ.

Preferably the margarines are stabilized by a gas which is inert in respect of the various ingredients present therein, e.g. air, carbon dioxide and preferably nitrogen. The gas content in the pourable margarine of the invention can vary within relatively wide limits, e.g. from 0.5 to 25%, but preferably from 1 to 10% of gas is used. Both the particle size of the hard fat particles and the bubble size of the gas bubbles are critical. Too large hard fat particles have too great a tendency to separate from the emulsion system, which tendency cannot sufficiently be counteracted by the stabilizing effect of the dispersed gas bubbles. If the gas bubbles have too great a diameter they will on storage separate from the pourable margarine by buoyancy forces, and thus the emulsion stabilizing effect of the gas bubbles is lost after some time. The lower limit for the particle size of the hard fat particles and the bubble size of the gas bubbles is determined by the possibilities of the commonly available equipment.

The margarines of the invention contain a fatty phase consisting of edible glyceride oils in which phase an aqueous phase is dispersed. In the emulsified system a gas phase is finely dispersed throughout. The fatty phase of the margarine contains as major constituent a glyceride oil which is pourable at all temperatures from 0–25° C. Both vegetable and animal liquid oils can in principle be used for the purpose of the invention. Preferably the liquid oils are free from substantial proportions of crystallized glycerides at all temperatures from 0–25° C.

Suitable liquid oils are e.g. oleins of animal fats, winterized cottonseed oil, olive oil, peanut oil and oils containing large proportions of polyunsaturated fatty acids.

Margarines containing a high content of polyunsaturated fatty acids, notably those known as essential fatty acids, are nowadays of particular interest since these products are widely believed to be dietetically beneficial.

It is therefore preferred that liquid vegetable oils containing at least 40% of polyunsaturated fatty acids are used for this purpose, e.g. sunflower, safflower, soybean, wheat germ, grapeseed, poppyseed, tobacco seed, rye, walnut or corn oil.

The hard fats which in minor proportions should be added to the liquid oil in the fatty phase of the pourable margarine are preferably substantially saturated hard fats. Such hard fats can e.g. be obtained by substantially completely hydrogenating a vegetable or animal oil, using common hydrogenation techniques e.g. as described in "Bailey's Industrial Oil and Fat Products," 3rd ed., Interscience Publishers, London 1964, pp. 866–871.

The amount of the hard fat present in the pourable margarine of the invention may vary depending on the type and melting point of the hard fat used and the process in which the emulsion is prepared.

Preferably from 1 to 5%, based on the total amount of the fatty phase, of a substantially saturated hard fat is used, e.g. substantially completely hydrogenated rapeseed oil, mustard seed oil, groundnut oil, soybean oil, sunflower oil, lard, tallow, palm oil or cottonseed oil.

The particle size of the hard fat particles present in the pourable emulsion is of great importance. Preferably hard fat of which at least 90% of the particles have a major dimension of from 0.1 to 30 microns, preferably from 0.1 to 5 microns, is used for the purpose of the invention.

For optimum stabilization it is of advantage to add emulsifiers to the emulsion of the present invention. Suitable emulsifiers are partial glyceride esters e.g. 0.1 to 1.0% of monoglycerides, especially those derived from long chain fatty acids, as e.g. present in palm oil, lard, etc., either alone or in combination with other emulsifiers, e.g. lecithin.

The expression "aqueous phase" herein refers to water or to water with the usual water soluble additives (see the following table) solubilized therein, which is the minor phase of the water-in-oil emulsions (margarines) of the invention.

The aqueous phase may contain water, salt, potassium sorbate, flavor, ground soybeans, or milk in the form of whole milk, cream, skim milk, or reconstituted skim milk.

Some suitable compositions for the aqueous phase are set forth in the following table.

| | Range [a] | 1 | 2 | 3 | 4 | 5 |
|---|---|---|---|---|---|---|
| Salt, p.p.m. | 0–4 | 1.75 | 1.0 | 4.0 | 1.75 | |
| Skim milk, p.p.m. | 0–19.7 | | 18.8 | | | |
| Skim milk solids, p.p.m. | 0–2 | 1.63 | | | | 1.80 |
| Water, p.p.m. | 0–19.7 | 16.30 | | 15.77 | 16.30 | 17.87 |
| K-sorbate, p.p.m. | 0–0.1 | 0.10 | | | 0.10 | 0.10 |
| Flavor, p.p.m. | 0–0.03 | 0.03 | | 0.03 | 0.03 | 0.03 |
| Ground soybeans, p.p.m. | 0–2 | | | | 1.63 | |
| EDTA, [b] p.p.m. | 0–75 | | | 75 | | |

[a] To a total of 19.7 to 20 parts.
[b] Disodium calcium ethylenediaminetetraacetate.

Excellent pourable margarines have been prepared consisting essentially of about 20% by weight of a milk solids containing aqueous phase emulsified with about 80% by weight of a fatty phase consisting essentially of about 96–99% by weight of sunflower oil and about 1–4% by weight of hydrogenated rapeseed oil of a slip melting point of 55–75° C. and a particle size of the hard fat particles of 0.1–5μ, and about 0.1–1% by weight of monoglycerides or phosphatides, said margarine being stabilized against oil separation by about 5% by volume of nitrogen bubbles of a bubble size of 2–10μ.

The pourable emulsions of the present invention may be used for the preparation of foodstuffs, e.g. soups, sauces, stews, gratinated dishes and sandwiches, but also for frying and baking purposes.

The product of the invention can be prepared by conventional margarine preparative techniques, for example by the use of scraped surface heat exchangers such as Votators. In such apparatus the blend of oil phase and aqueous phase, including such additives as are customary in the preparation of margarine, for example emulsifiers and flavouring additives, are simultaneously blended and chilled e.g. to from 0° to 20° C. Further details of this preparative method appear in "Margarine" by Anderson and Williams, Pergamon Press, London, 1954, pages 228 et seq. which is hereby incorporated by reference.

Stabilizing gas may be introduced into the water-in-oil emulsion first formed, either during or after the chilling stage. The stabilized pourable margarine is then preferably stored for from 5 to 50 hours at from 5 to 18° C.

When the gas is introduced into the cooled margarine emulsion, the emulsion after having passed a conventional stirred crystallizer unit, is fed into an Oakes mixer as described in U.S. patent specification 2,687,877, into which at high pressure the required amount of gas is introduced and finally divided into the emulsion.

It is preferred that the process is carried out by the following sequence of steps (a) blending 92–99.5% by weight of a glyceride oil which is pourable at all temperatures from 0–25° C. and 0.5–8% by weight of a melted hard fat of a slip melting point of 40–80° C. to form a fatty phase;
(b) emulsifying about 25–15% by weight of an aqueous phase and the fatty phase to form a water-in-oil emulsion;
(c) cooling and working the emulsion to a temperature of 0–20° C. to obtain crystallized hard fat particles, at least 90% of which have a major dimension of 0.1–30μ;

(d) finely dividing from 0.5–25% of a gas into the cooled emulsion to obtain gas bubbles, at least 90% of which have a major dimension of 1–25µ;
(e) filling the cooled emulsion into receptacles and storing the filled receptacles for at least 5 hours at a temperature of 5–18° C.

The gas can also be introduced into the emulsion before cooling. In that case the premix, containing all the conventional ingredients of the pourable margarine, is aerated with a flow of gas of high pressure, e.g. 6 atmosphere gauge pressure, for 0.5 to 3 hours. Subsequently the gas pressure is released e.g. to 0.75 atmosphere when 3% gas, 1 atmosphere when 4.7% gas, 2 atmosphere when 10% gas and 3 atmosphere when 15% gas is required.

If the latter technique is applied the following sequence of steps is preferred (a) blending 92–99.5% by weight of a glyceride oil which is pourable at temperatures from 0–25° C. and 0.5–8% by weight of a melted hard fat of a slip melting point of 40–80° C.;
(b) emulsifying about 25–15% by weight of an aqueous phase and the balance of the fatty phase to form a water-in-oil emulsion;
(c) finely dividing from 0.5–25% of a gas into the emulsion to obtain gas bubbles, at least 90% of which have a major dimension of 1–25µ;
(d) cooling and working the emulsion to a temperature of 0–20° C. to obtain crystallized hard fat particles, at least 90% of which have a major dimension of 0.1–30µ;
(e) filling the cooled emulsion into receptacles and storing the filled receptacles for at least 5 hours at a temperature of 5–18° C.

Although the emulsion stabilizing effect of gas according to the present invention has been mainly illustrated with pourable margarines, all kinds of pourable emulsions including low caloric spreads containing from 30–60% of fat or food spreads not containing the conventional butter or margarine flavours but, for instance, fruit flavours instead, may be stabilized against phase separation by the incorporation of an emulsion stabilizing amount of gas.

Test for the consistency measurement of the pourable margarines.—500 ml. of the emulsion are filled into a rectangular receptacle of 85 mm. width and 60 mm. depth, which receptacle is provided with a cone-shaped bottom to which a flow valve of 6 mm. internal diameter is attached. This receptacle is stored at 12° C. for 24 hours and subsequently it is tempered at the desired measuring temperature (e.g. 6 or 18° C.).

After tempering the low valve is opened and the time is measured for 300 ml. emulsion to flow down in a 500 ml. measuring cylinder.

The invention will now be illustrated by the following examples:

Examples I–III

Three pourable margarines were prepared from 82 parts by weight of a fat blend and 18 parts by weight of an aqueous phase. The fat blends consisted of refined sunflower oil and 1.0, 1.5 and 2.0% of fully hydrogenated rapeseed oil of a slip melting point of 60° C. The sunflower oil contained 65% of linoleic acid calculated on the total amount of fatty acids and was pourable at temperatures of from —5° C.

To this fat blend colouring agents, vitamins and flavours were added.

The aqueous phase consisted of skim milk, salt and water.

The fat blends were melted and the aqueous phase was dispersed therein.

The emulsions obtained were cooled in a Votator A unit to a temperature of 7° C. and the cooled emulsions obtained were worked in a conventional stirred crystallizer unit.

About 90% of the hard fat particles in the emulsion had a particle size of from 0.1 to 5 microns.

5% by volume of nitrogen was finely divided into these emulsions by means of an Oakes mixer as described in U.S. patent specification 2,687,877, the inlet of which was connected with the outlet of the crystallizer unit. The nitrogen was introduced at a pressure of 7 kg./cm.$^2$ whereas the pressure of the margarine emulsion at the point of intake was about 4 kg. cm.$^2$. The Oakes mixer was adjusted at 300 r.p.m. The bubble size of at least 90% of the gas bubbles was from 2–10 microns.

The aerated liquid margarine was filled into receptacles which were stored for 36 hours at a temperature of 12° C. Subsequently the stability against phase separation of the pourable margarines obtained was assessed after 3 weeks' storage at 18° C. in glass cylinders of a diameter of 7 cm. which were filled to a height of 10 cm.

For the stability of the emulsion the following scores were used:

1=poor stability, which means more than 15 mm. oil separation;
2=fair stability, which means more than 10 mm. but less than 15 mm. oil separation;
3=average stability, which means less than 10 mm. but more than 5 mm. oil separation;
4=good stability, which means less than 5 mm. but more than 1 mm. oil separation;
5=excellent stability, which means less than 1 mm. oil separation.

The consistency of the margarines was determined by measurement of flow rate as described before.

The scores for emulsion stability of the aerated margarines were compared with scores given to the same margarines but free from gas.

The results were:

| Example | Percent liquid oil | Percent hard fat | Percent nitrogen | Emulsion stability score | Consistency (flow valve sec./300 ml.) At 6° C. | At 18° C. |
|---|---|---|---|---|---|---|
| I | 99.0 | 1.0 | 5 | 3 | 30 | 20 |
| Control | 99.0 | 1.0 | 0 | 2 | 26 | 20 |
| II | 98.5 | 1.5 | 5 | 3 | 38 | 30 |
| Control | 98.5 | 1.5 | 0 | 1 | 35 | 30 |
| III | 98.0 | 2.0 | 5 | 4 | 103 | 80 |
| Control | 98.0 | 2.0 | 0 | 2 | 54 | 40 |

Thus the products of the invention have a better stability against phase separation when compared with the products free from gas.

Examples IV and V

Example II was repeated except that part of the liquid oil was replaced by emulsifiers.

As emulsifiers a mixture of mono- and diglycerides derived from lard were used containing 40% of monoglycerides.

The results were:

| Example | Percent liquid oil | Percent hard fat | Percent emulsifier | Percent nitrogen | Emulsion stability score | Consistency (flow valve sec./300 ml.) At 6° C. | At 18° C. |
|---|---|---|---|---|---|---|---|
| IV | 98.25 | 1.5 | 0.25 | 5 | 4 | 55 | 48 |
| Control | 98.25 | 1.5 | 0.25 | 0 | 2 | 47 | 42 |
| V | 98.0 | 1.5 | 0.5 | 5 | 4 | 60 | 55 |
| Control | 98.0 | 1.5 | 0.5 | 0 | 2 | 52 | 45 |

The products of Examples IV and V showed an improved stability against phase separation as compared with the control samples and also as compared with the product of Example II, which was free from emulsifiers. The consistency values were further improved.

Example VI

Example III was repeated except that part of the liquid oil was replaced by soybean phosphatides marketed under the trade name "Stasol."

The results were:

| Example | Percent liquid oil | Percent hard fat | Percent emulsifier | Percent nitrogen | Emulsion stability score | Consistency (flow valve sec./300 ml.) At 6° C. | At 18° C. |
|---|---|---|---|---|---|---|---|
| VI | 97.7 | 2 | 0.3 | 5 | 5 | 215 | 160 |
| Control | 97.7 | 2 | 0.3 | 0 | 4 | 140 | 80 |

This product had a better stability against phase separation as compared with the products free from emulsifier. Moreover the aerated product had a better emulsion stability score than the control sample which also contained 0.3% emulsifier but which was free from gas.

Examples VII and VIII

Example VI was repeated, except that other inert gases and different quantities thereof were used as emulsion stabilizers. For Example VII an amount of 7% helium and for Example VIII 18% carbon dioxide was used. The bubble size of the gas bubbles in both examples was such that at least 90% of the gas bubbles had a major dimension of 2 to 10 microns.

The results were:

| Example | Percent liquid oil | Percent hard fat | Percent emulsifier | Percent gas | Emulsion stability score | Consistency (flow valve sec./300 ml.) At 6° C. | At 18° C. |
|---|---|---|---|---|---|---|---|
| VII | 97.7 | 2 | 0.3 | 7 | 5 | 230 | 170 |
| VIII | 97.7 | 2 | 0.3 | 18 | 4 | >600 | |

These examples show that very stable pourable margarines are to be obtained, even with a gas content of up to about 20%.

The margarine containing less than about 10% of gas showed a slightly better stability and a better consistency than the product containing 18% of gas.

Example IX

Example I was repeated, except that now 4% of hard fat was used (based on the total amount of fatty matter).

The emulsion stability score was 5 for the aerated pourable margarine, whereas the control sample (which was free from gas) got the score 4.

Examples X–XII

The compositions were as described in Examples I–III respectively, except that the sunflower oil was replaced by safflower oil and the hydrogenated rapeseed oil by fully hydrogenated groundnut oil of a slip melting point of 62° C.

No significant differences in emulsion stability and consistency were observed.

Acceptable results are obtained if in Examples I to XII hard fat particles are used of 0.1–30 microns and gas bubbles of 1–25 microns, instead of hard fat particles of 0.1–5 microns and gas bubbles of 2–10 microns.

What is claimed is:

1. A pourable margine consisting essentially of from about 25–15% by weight of an aqueous phase emulsified with a fatty phase, said fatty phase consisting essentially of from 92–99.5% by weight of a glyceride oil which is pourable at all temperatures from 0–25° C. and the remainder of a hard fat of a slip melting point of from 40–80° C. and a particle size of at least 90% of the hard fat particles of 0.1 to 30$\mu$, the margarine being stabilized against oil separation by 0.5–25% by volume of gas bubbles, at least 90% of which have a major dimension of 1–25$\mu$.

2. A pourable margarine consisting essentially of about 20% by weight of an aqueous phase emulsified with about 80% by weight of a fatty phase, said fatty phase consisting essentially of from 92–99.5% by weight of a liquid vegetable oil, at least 40% of the fatty aicds of said liquid oil being polyunsaturated fatty acids, and the remainder of the fatty phase being a hard fat of a slip melting point of from 40–80° C. and a particle size of at least 90% of the hard fat particles of 0.1 to 30$\mu$, the margarine being stabilized against oil separation by 0.5–25% by volume of gas bubbles, at least 90% of which have a major dimension of 1–25$\mu$.

3. A pourable margarine consisting essentially of about 20% by weight of an aqueous phase emulsified with about 80% by weight of a fatty phase, said fatty phase consisting essentially of from 92–99.5% by weight of a liquid vegetable oil, at least 40% of the fatty acids of said liquid oil being polyunsaturated fatty acids, and the remainder of the fatty phase being a hard fat of a slip melting point of from 40–80° C. and a particle size of at least 90% of the hard fat particles of 0.1 to 30$\mu$, the margarine being stabilized against oil separation by 0.5–25% by volume of gas bubbles, at least 90% of which have a major dimension of 2–10$\mu$.

4. A pourable margarine according to claim 1 wherein 1–10% by volume of gas bubbles are present.

5. A pourable margarine according to claim 1 wherein the gas bubbles contain nitrogen.

6. A pourable margarine according to claim 1 wherein the glyceride oil, which is pourable at temperatures from 0 to 25° C., comprises safflower, sunflower, soybean, wheat germ, grapeseed, poppyseed, rye, walnut or corn oil.

7. A pourable margarine according to claim 1 wherein the hard fat component is a substantially completely hydrogenated vegetable or animal oil.

8. A pourable margarine according to claim 1 wherein at least 90% of the hard fat particles have a major dimension of 0.1 to 5µ.

9. A pourable margarine according to claim 1 wherein 0.1 to 1% by weight of monoglycerides are present.

10. A pourable margarine according to claim 1 wherein 0.1 to 0.5% by weight of phosphatides are present.

11. A pourable margarine consisting essentially of about 20% by weight of a milk solids containing aqueous phase emulsified with about 80% by weight of a fatty phase consisting essentially of about 96–99% by weight of sunflower oil and about 1–4% by weight of hydrogenated rapeseed oil of a slip melting point of 55–75° C. and a particle size of the hard fat particles of 0.1–5µ, and about 0.1–1% by weight of monoglycerides or phosphatides, said margarine being stabilized against oil separation by about 5% by volume of nitrogen bubbles of a bubble size of 2–10µ.

12. Process for preparing a pourable margarine of improved stability against oil separation which consists essentially of
 (a) blending 92–99.5% by weight of a glyceride oil which is pourable at all temperatures from 0–25° C. and 0.5–8% by weight of a melted hard fat of a slip melting point of 40–80° C. to form a fatty phase;
 (b) emulsifying about 25–15% by weight of an aqueous phase and the fatty phase to form a water-in-oil emulsion;
 (c) cooling and working the emulsion to a temperature of 0–20° C. to obtain crystallized hard fat particles, at least 90% of which have a major dimension of 0.1–30µ;
 (d) finely dividing from 0.5–25% of a gas into the cooled emulsion to obtain gas bubbles, at least 90% of which have a major dimension of 1–25µ;
 (e) filling the cooled emulsion into receptacles and storing the filled receptacles for at least 5 hours at a temperature of 5–18° C.

13. Process for preparing a pourable margarine of improved stability against oil separation which consists essentially of
 (a) blending 92–99.5% by weight of a glyceride oil which is pourable at temperatures from 0–25° C. and 0.5–8% by weight of a melted hard fat component of a slip melting point of 40–80° C.;
 (b) emulsifying about 25–15% by weight of an aqueous phase and the balance of the fatty phase to form a water-in-oil emulsion;
 (c) finely dividng from 0.5-25% of a gas into the emulsion to obtain gas bubbles, at least 90% of which have a major dimension of 1–25µ;
 (d) cooling and working the emulsion to a temperature of 0–20° C. to obtain crystallized hard fat particles, at least 90% of which have a major dimension of 0.1–30µ;
 (e) filling the cooled emulsion into receptacles and storing the filled receptacles for at least 5 hours at a temperature of 5–18° C.

References Cited
UNITED STATES PATENTS

| | | | |
|---|---|---|---|
| 1,467,081 | 9/1923 | Ayres | 99—122 |
| 3,338,720 | 8/1967 | Pichel | 99—123 |
| 3,397,998 | 8/1968 | Fricks | 99—122 R X |
| 3,472,661 | 10/1969 | Melnick | 99—123 |

JOSEPH M. GOLIAN, Primary Examiner

U.S. Cl. X.R.

99—123